United States Patent
Cleary et al.

(10) Patent No.: US 8,074,355 B1
(45) Date of Patent: Dec. 13, 2011

(54) METHOD FOR MANUFACTURING A CONNECTING ROD FOR AN ENGINE

(75) Inventors: Terrance M. Cleary, Fond du Lac, WI (US); Raymond J. Donahue, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 1069 days.

(21) Appl. No.: 11/936,898

(22) Filed: Nov. 8, 2007

(51) Int. Cl.
B21D 53/84 (2006.01)

(52) U.S. Cl. ............. 29/888.092; 29/888.09; 74/579 E; 123/197.3

(58) Field of Classification Search ............... 29/888.09, 29/888.091, 888.092, 413; 148/662, 663, 148/664; 74/579 E, 579 R; 123/197.3, 197.4
See application file for complete search history.

(56) References Cited

U.S. PATENT DOCUMENTS

| | | | |
|---|---|---|---|
| 3,818,577 A * | 6/1974 | Bailey et al. ................... | 29/413 |
| 3,951,697 A * | 4/1976 | Sherby et al. ................... | 419/23 |
| 3,994,054 A | 11/1976 | Cuddon-Fletcher et al. | |
| 4,005,674 A | 2/1977 | Davis | |
| 4,009,678 A | 3/1977 | North | |
| 4,027,555 A | 6/1977 | Rauchle et al. | |
| 4,052,952 A | 10/1977 | Hale et al. | |
| 4,253,349 A | 3/1981 | Fleeter et al. | |
| 4,303,137 A * | 12/1981 | Fischer ......................... | 175/374 |
| 4,391,592 A | 7/1983 | Hundertmark | |
| 4,436,443 A | 3/1984 | McCormick | |
| 4,482,331 A | 11/1984 | Boda | |
| 4,583,500 A | 4/1986 | Hundertmark | |
| 4,595,370 A | 6/1986 | Small | |
| 4,693,139 A * | 9/1987 | Mukai et al. ................. | 74/579 E |
| 4,771,744 A | 9/1988 | Corbett | |
| 4,803,963 A | 2/1989 | Kleinhans | |
| 4,813,897 A | 3/1989 | Newman et al. | |
| 4,836,812 A | 6/1989 | Griffiths | |
| 4,872,859 A | 10/1989 | Griffiths et al. | |
| 4,873,951 A | 10/1989 | Garthwaite | |
| 4,936,163 A * | 6/1990 | Hoag et al. ................. | 74/579 E |
| 5,048,368 A * | 9/1991 | Mrdjenovich et al. ...... | 74/579 E |
| 5,074,193 A | 12/1991 | Hundertmark | |
| 5,302,216 A * | 4/1994 | Sugita et al. .................. | 148/595 |
| 5,392,690 A | 2/1995 | Hundertmark | |
| 5,516,483 A * | 5/1996 | Shivanath et al. ............. | 419/14 |
| 5,536,089 A * | 7/1996 | Weber et al. .................. | 384/294 |
| 5,568,891 A * | 10/1996 | Hoag et al. ..................... | 225/93 |
| 5,647,702 A | 7/1997 | Towers et al. | |
| 5,797,554 A | 8/1998 | Atherton et al. | |

(Continued)

OTHER PUBLICATIONS

The Metallurgy of Carbon Steel (http://www.gowelding.com/met/htm); May 8, 2002.*

Primary Examiner — David Bryant
Assistant Examiner — Ryan J Walters
(74) Attorney, Agent, or Firm — Andrus, Sceales, Starke & Sawall, LLP

(57) ABSTRACT

A method for manufacturing a connecting rod for an engine contemplates creating a rough connecting rod from high carbon steel. The rough connecting rod is normalized to provide strength and toughness characteristics to the core of the connecting rod for functional operation. A first, second or both ends of the connecting rod are selectively induction hardened to create a durable martensitic structure in those ends. The connecting rod is then cracked and ground to form a final connecting rod for use in internal combustion engines.

14 Claims, 1 Drawing Sheet

U.S. PATENT DOCUMENTS

| | | | |
|---|---|---|---|
| 5,882,438 A * | 3/1999 | Luchner et al. | 148/222 |
| 6,007,391 A | 12/1999 | Eilert | |
| 6,067,952 A | 5/2000 | Andrasko et al. | |
| 6,112,707 A | 9/2000 | Kirk | |
| 6,138,634 A | 10/2000 | Kusche et al. | |
| 6,283,806 B1 | 9/2001 | Schmidt et al. | |
| 6,676,574 B1 | 1/2004 | Prokop et al. | |
| 6,890,227 B1 | 5/2005 | Alby et al. | |
| 6,913,497 B1 | 7/2005 | Ahlswede et al. | |
| 6,961,997 B2 * | 11/2005 | Kubota et al. | 29/888.09 |
| 7,056,169 B1 | 6/2006 | Lokken et al. | |
| 7,150,664 B1 | 12/2006 | Uppgard et al. | |
| 7,159,559 B2 * | 1/2007 | Iwasaki et al. | 123/197.3 |
| 7,198,019 B1 | 4/2007 | Belter | |
| 7,207,854 B1 | 4/2007 | Anderson, Jr. et al. | |
| 7,500,417 B2 * | 3/2009 | Ogawa et al. | 74/579 E |
| 2002/0112787 A1 * | 8/2002 | Asano et al. | 148/335 |
| 2004/0025340 A1 * | 2/2004 | Kubota et al. | 29/888.09 |
| 2004/0159180 A1 * | 8/2004 | Ogawa et al. | 74/593 |

* cited by examiner

METHOD FOR MANUFACTURING A CONNECTING ROD FOR AN ENGINE

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

A connecting rod in an internal combustion engine provides linkage between the piston and the crankshaft. Particularly in two stroke cycle internal combustion engines, this linkage is done in a low lubricant environment. To accomplish this linkage, the connecting rod generally uses rolling element bearings between the crankshaft and the connecting rod at a first, large end of the connecting rod and also between the piston pin and the connecting rod at a second, small end of the connecting rod. The first, large end of the connecting rod includes a large end hole. Conventionally, after a rod is forged or cast, the rod is cracked in a brittle manner to form a two component connecting rod that is assembled on to the crankshaft through the large end hole. Thus, after cracking, the connecting rod may be reassembled with bolts in a manner that gives optimal registry. Cracking of connecting rods is known in the industry.

It is also known that the connecting rod may be forged from a low carbon steel alloy having, at the very least, less than 0.70% carbon by weight, and usually having less than 0.20% by weight. However, in these conventional connecting rods, the rolling element bearing cannot successfully run on the forged surface because the low carbon steel is not strong enough to resist mechanical deformation caused by the load transmitted from the piston through the roller bearings during the combustion process. To resolve this problem it is known to carburize low carbon steel connecting rods to increase the carbon level near the surface area. The higher carbon level material can then be heat treated to form a specific microstructural constituent known as martensite.

Carburizing is the addition of carbon to the surface of low carbon steels at temperatures generally between 850° and 950° C. (1560-1740° F.) at which austenite is the stable crystal structure. It is known that austenite has a high solubility for carbon and therefore it is ideal to carburize at the austenite temperature. Hardening of the carburized surface is accomplished when the high carbon surface layers are quenched to form martensite. Thus, the carburization process allows for a high carbon martensitic case with good wear and fatigue resistance to be superimposed on a tough, low-carbon steel core.

During the martensitic heat treatment process after carburization, the low-carbon steel connecting rod undergoes a solid state transformation. Initially, the part is in a body centered cubic (BCC) structure at room temperature. The BCC structure is a fairly soft metallic state and is only able to dissolve a limited amount of carbon. During the heat treatment, the part is heated until it reaches a temperature where the low energy condition of the material is preferable to transform into a face centered cubic (FCC) structure. In the FCC structure, many more carbon atoms are able to fit into the interstitial portions of structure as compared to the BCC structure. After the carbon molecules have diffused to the interstitial positions, the part is rapidly cooled or quenched. During the quenching process, the part is transformed at a temperature where the structure is generally of the BCC type. However, if the cooling is sufficiently fast enough, then the carbon atoms do not have enough time to diffuse from the interstitial positions of the FCC structure, and the carbon atoms remain packed in the interstitial positions. At room temperature, the diffusion coefficient of carbon is very low and carbon will essentially be trapped in the position it is in. Since the BCC structure cannot contain this much carbon at room temperature, a third structure, martensite, with a body centered tetragonal (BCT) structure is formed. This crystalline structure has a very high amount of internal stress. Due to this internal stress, the product is extremely hard but brittle, usually too brittle for practical purposes. This internal stress may also cause stress cracks on the surface of the product. From the quenched condition, the part is tempered to increase the toughness, but only slightly, as a surface hardness of 60-63 hardness Rockwell C is desired. The tempering process is well known to those in the art.

Forging is a manufacturing process where metal is shaped by plastic deformation under great pressure into high strength parts. There is no melting and consequent solidification involved. Forging's plastic deformation produces an increase in the number of dislocations resulting in a higher state of internal stress. This strain hardening is attributed to the interaction of dislocations with other dislocations and other barriers, such as grain boundaries. Simultaneously, the shape of primary crystals (dendrites) changes after this plastic working of the metal. Dendrites are stretched in the direction of metal flow and thus form fibers of increased strength along the direction of flow.

Conversely, the manufacturing process of casting consists of pouring or injecting molten metal into a mold containing a cavity with the desired shape of the casting. Metal casting processes can be classified either by the type of mold or by the pressure used to fill the mold with liquid metal. Since casting is a solidification process, the microstructure can be finely tuned, such as grain structure, phase transformations and precipitation. However, defects such as shrinkage porosity, cracks and segregation are also linked to casting's solidification process. These defects may lead to lower mechanical properties in some castings. Subsequent heat treatment is often required to reduce residual stresses and optimize mechanical properties in cast products.

The connecting rod is machined to a near-net shape before the heat treating process. This is done because the cost to machine large amounts of hard material is costly and it is also difficult to create the hardness profile that is required for the part. Unfortunately, the solid state phase transformation distorts the connecting rod. Particularly, this distortion occurs during the quenching operation of the current process when the crystal structure changes from FCC to BCT. Such connecting rods are measured for distortion and straightened by bending. Accordingly, it is desired to create as little distortion as possible of the connecting rod from heat treatment through the phase changes. Ideally, the distortion is limited to less than the final grinding allowance. Thus, in conventional connecting rod manufacturing, the connecting rod has to be straightened before it can be used. Such straightening is a non-value added operation during the manufacturing process of a connecting rod.

Problems also arise if the connecting rod is completely carburized. The section of the connecting rod between the ends usually has a configuration of a thin-walled I-beam. Carburization of the thin-walled I-beam results in an unfavorable through thickness hardness condition. While this condition has good strength properties, it has poor fracture toughness. Thus, the connecting rod is subject to brittle fracture from any impact type loading, and an engine misfire event could cause a fractured connecting rod.

To address the through thickness hardness condition, connecting rods are normally copper plated. Since the diffusion of carbon in copper is very low, the copper effectively masks the carbon and prevents diffusion. After the copper plating process, the connecting rod may be selectively machined to remove the copper in areas where the part is to be carburized. As aforementioned, these areas are typically where the bearing rollers contact the rod at the thrust faces of the first and second ends of the connecting rod. Since these areas have to ultimately be machined, the copper plating is not considered to be a value added operation.

Thus, significant road blocks impede a cost-effective process for manufacturing strong, durable connecting rods for internal combustion engines.

BRIEF SUMMARY OF THE INVENTION

The present disclosure provides a method for manufacturing a connecting rod for an engine. Connecting rods manufactured in accordance with this method have a first end for interaction with rolling elements allowing for connection with an engine crankshaft, and a second end for interaction with rolling element bearings allowing connection with an engine piston pin. The method includes creating a rough connecting rod from high carbon steel. The high carbon steel has a carbon constituency in the range of 0.70% to 1.0% by weight. The method also includes normalizing a connecting rod to provide strength and toughness properties to a core of the connecting rod for functional operation. The method contemplates selectively induction hardening the first, second or both ends of the connecting rod to create a martensitic structure at the end or ends. A final connecting rod is formed by cracking the first end of the connecting rod to form a two-component connecting rod that can be assembled on to a crankshaft and grinding the connecting rod to a final size.

The connecting rod may either be cast or forged when created and may also include allowable secondary alloy elements.

The normalizing step includes heating a rough connecting rod to an austenite transformation temperature and holding the connecting rod above the austenite transformation temperature until the rough connecting rod is substantially completely austenitized. The connecting rod is then air cooled to create a part with a BCC structure having two structure phases composed of alternating plates of alpha-ferrite and iron carbide.

The induction hardening step is accomplished by energizing at least one electrical coil and bringing an electrical coil into functional proximity with an end of a connecting rod. The end of the connecting rod is heated above the austenitic temperature and quenched. This quenching forms a martensitic structure in a limited area of the rod. The induction hardening step may be selectively imparted on a first, second or both ends of the connecting rod to provide a martensitic structure in either or both ends of an exact size and of an exact location on the rod. The step of induction hardening creates a connecting rod with high hardness due to the martensitic transformation, not throughout the entire rod, but instead only where high hardness is required functionally.

The connecting rods manufactured by the method disclosed herein are used in internal combustion engines. The engine may be a marine engine or a two stroke engine.

DETAILED DESCRIPTION

Figure 1:
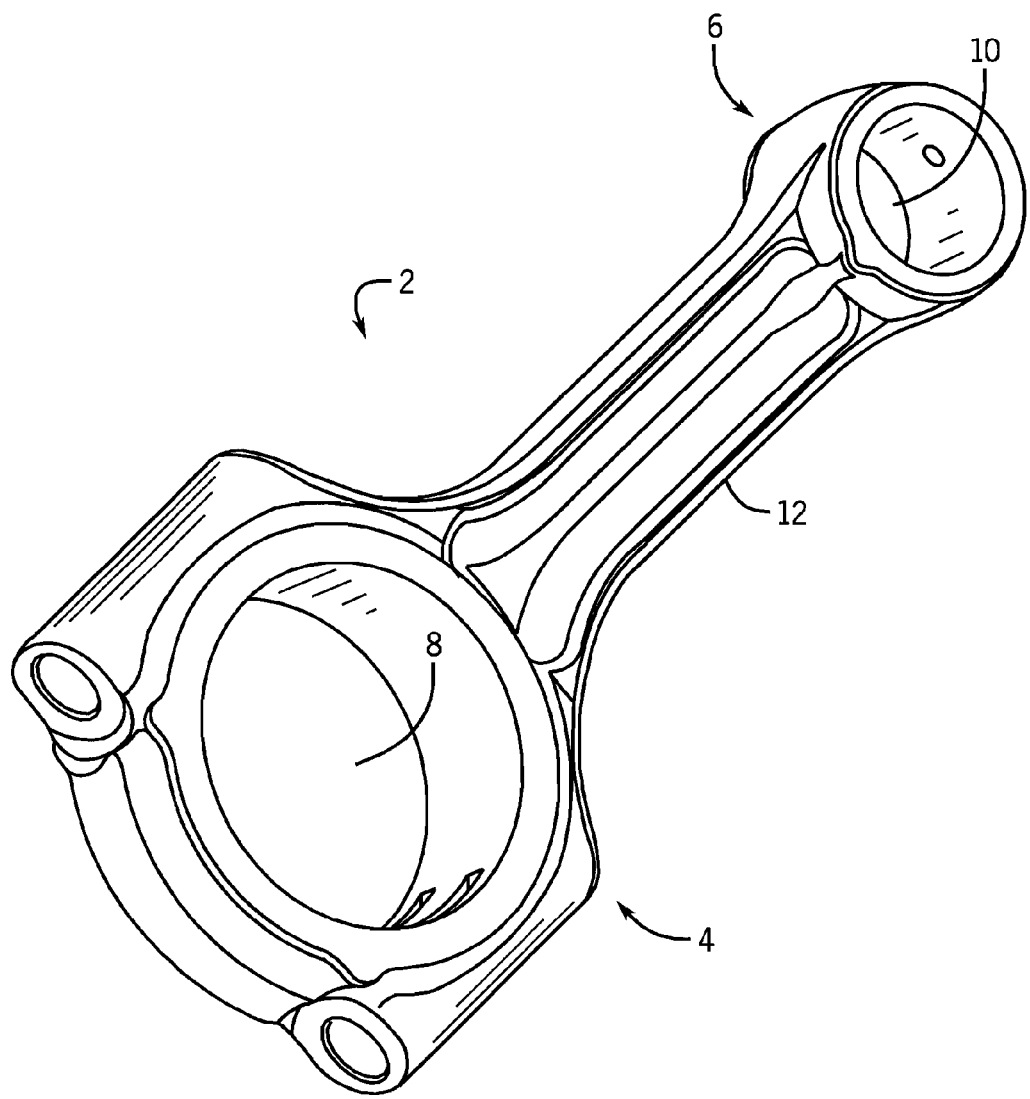
FIG. 1 is a perspective view of an exemplary connecting rod manufactured by the method disclosed herein.

Referring first to FIG. 1, a conventional connecting rod 2 includes a first end 4 and a second end 6. The first end 4 and second end 6 are joined by an I-beam 12. The first end 4 includes a large end hole 8, while the second end 6 includes a small end hole 10. The connecting rod 2 is connected at the first, large end 4 to the crankshaft through rolling element bearings (not shown). The second end 6 is connected through the small end hole 10 to a piston pin, also through rolling element bearings.

The linkage between the connecting rod 2 and the crankshaft is done in a low lubricant environment. Rolling element bearings are required in this environment. The large end hole 8 and the small end hole 10 must be sufficiently strong to resist mechanical deformation caused by the load transmitted from the piston through the bearing rollers during the combustion process.

Accordingly, a method for manufacturing a connecting rod for an internal combustion engine is disclosed herein. This method provides for the manufacturing of a strong, durable connecting rod either through forging or casting. The rods are intended to be used in internal combustion engines, including two stroke internal combustion engines and marine engines.

In the method, a rough connecting rod is first cast or forged from high carbon steel. High carbon steel has a carbon constituency in the range of 0.70% to 1.0% or 0.70% to 1.2% by weight. This is much higher than conventional low carbon steel which generally has a carbon constituency of less than 0.70%, and usually less than 0.20%.

Once the rough connecting rod is cast or forged, the connecting rod undergoes a normalization process. Normalizing the connecting rod provides strength and toughness properties to a core of the connecting rod for functional operation. In normalizing the rough connecting rod, the connecting rod is heated to an austenite transformation temperature between 1350° F. and 1520° F. The rod is held above the austenite transformation temperature until the part is substantially completely austenitized. The part is then air cooled to room temperature. This normalizing step creates a rough connecting rod with a BCC microstructure having two structure phases composed of alternating plates of alpha-ferrite and iron carbide.

After normalizing the rough connecting rod, the connecting rod is machined into near-final form. At this point, the rod may be selectively induction hardened. Induction hardening allows for the selective hardening of a particular part of the connecting rod. The method disclosed herein envisions selectively induction hardening either at the first end of the connecting rod, the second end of the rod, or both ends of the connecting rod. To selectively induction harden the portion of the connecting rod, the portion of the rod that is to be induction hardened is brought into functional proximity with an energized electrical coil. The energized electrical coil heats the specified end of the connecting rod above the austenitic transformation temperature. After the selected portion of the connecting rod has been heated above the austenitic transformation temperature, the connecting rod is then quenched to form a martensitic structure in the selectively induction hardened portion. This process may be repeated with other portions of the connecting rod that are to be induction hardened. For example, the first large end may be selectively induction hardened and quenched and subsequently the small, second end may be selectively induction hardened and quenched. Whether the first end or second end is selectively induction hardened before the other is of no consequence. Moreover, depending on cost and perceived durability issues, only one of the first or second ends may be selected for induction hardening. As a result of the selective induction hardening step, a martensitic BCT structure having high hardness is formed in the particular parts of the connecting rod that are induction hardened.

After induction hardening, the connecting rod is cracked in a known manner at the large end hole with the connecting rod to form a two component connecting rod that can be assembled on to the crankshaft. Finally, the connecting rod undergoes a grinding process to shape the connecting rod into final size for use in an internal combustion engine.

Accordingly, through the method of the present disclosure, a high carbon steel connecting rod may be manufactured at low cost. It is apparent to those skilled in the art that the present invention as described herein contains several features, and that variations to the preferred embodiment as disclosed herein may be made which embody only some of the features disclosed herein. In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems, and method steps described herein may be used alone or in combination with other configurations, systems and method steps. Various other combinations, and modifications are alternatives may also be apparent to those skilled in the art. Such various alternatives and other embodiments are contemplated as being within the scope of the following claims to particularly point out and distinctly claim subject matter regarding the same invention.

What is claimed is:

1. A method for manufacturing a connecting rod for an internal combustion engine,
    the connecting rod having a first end for interaction with rolling element bearings allowing connection with a crankshaft,
    the first end including a large end hole,
    and a second end for interaction with rolling element bearings allowing connection with a piston pin,
    the method comprising:
    forging a rough connecting rod from high carbon steel,
    the high carbon steel having a carbon constituency in the range of 0.80% to 1.2% by weight;
    normalizing the connecting rod to provide strength and toughness properties to a core of the connecting rod for functional operation, the step of normalizing comprising:
    heating the rough connecting rod to a austenite transformation temperature,
    holding the rough connecting rod at or above the austenite transformation temperature until the rough connecting rod is austenitized, and
    air cooling the rough connecting rod,
    wherein the step of normalizing forms, in the rough connecting rod, a BCC structure having two structure phases composed of alternating plates of alpha-ferrite and iron carbide;
    machining the rough connecting rod into near-final form;
    selectively induction hardening the first end and the second end of the connecting rod,
    the step of selectively induction hardening further comprising
    energizing an electrical coil;
    bringing the coil into functional proximity with the first end of the connecting rod,
    heating the first end of the connecting rod at or above the austenite transformation temperature,
    quenching the first end to form a martensite structure in the first end,
    bringing the coil into functional proximity with the second end of the connecting rod,
    heating the second end of the connecting rod at or above the austenite transformation temperature, and
    quenching the second end to form a martensite structure in the second end;
    wherein the martensite structure is a BCT structure having high hardness;
    cracking the large end hole of the connecting rod to form a two component connecting rod that can be assembled on to the crankshaft; and
    grinding the large end hole of the rod to a final size.

2. The method of claim 1, wherein the step of forging includes providing the high carbon steel further having allowable secondary alloy elements.

3. The method of claim 1, wherein the austenite transformation temperature is between 1350° F. and 1520° F.

4. The method of claim 1, wherein the quenching occurs in a temperature range between 250° F. and −50° F.

5. The method of claim 1, wherein the engine is an internal combustion engine.

6. The method of claim 1, wherein the engine is a marine engine.

7. The method of claim 1, wherein the engine is a two stroke engine.

8. A method for manufacturing a connecting rod for an internal combustion engine,
    the connecting rod having a first end for interaction with rolling element bearings allowing connection with a crankshaft,
    the first end including a large end hole,
    and a second end for interaction with rolling element bearings allowing connection with a piston pin,
    the method comprising:
    casting a rough connecting rod from high carbon steel,
    the high carbon steel having a carbon constituency in the range of 0.80% to 1.2% by weight;
    normalizing the connecting rod to provide strength and toughness properties to a core of the connecting rod for functional operation, the step of normalizing comprising:
    heating the rough connecting rod to a austenite transformation temperature,
    holding the rough connecting rod at or above the austenite transformation temperature until the rough connecting rod is austenitized, and
    air cooling the rough connecting rod,
    wherein the step of normalizing forms, in the rough connecting rod, a BCC structure having two structure phases composed of alternating plates of alpha-ferrite and iron carbide;
    machining the rough connecting rod into near-final form;
    selectively induction hardening the first end and the second end of the connecting rod, the step of selectively induction hardening further comprising
energizing an electrical coil;
bringing the coil into functional proximity with the first end of the connecting rod,
heating the first end of the connecting rod at or above the austenite transformation temperature,
quenching the first end to form a martensite structure in the first end,
bringing the coil into functional proximity with the second end of the connecting rod,
heating the second end of the connecting rod at or above the austenite transformation temperature, and
quenching the second end to form a martensite structure in the second end;
wherein the martensite structure is a BCT structure having high hardness;
cracking the large end hole of the connecting rod to form a two component connecting rod that can be assembled on to the crankshaft; and
grinding the large end hole of the rod to a final size.

9. The method of claim 8, wherein the step of casting includes providing the high carbon steel further having allowable secondary alloy elements.

10. The method of claim 8, wherein the austenite transformation temperature is between 1350° F. and 1520° F.

11. The method of claim 8, wherein the quenching occurs in a temperature range between 250° F. and −50° F.

12. The method of claim 8, wherein the engine is an internal combustion engine.

13. The method of claim 8, wherein the engine is a marine engine.

14. The method of claim 8, wherein the engine is a two stroke engine.

* * * * *